S. W. FRANCIS.
Signals for Telephone and Telegraph Lines.
No. 219,244. Patented Sept. 2, 1879.
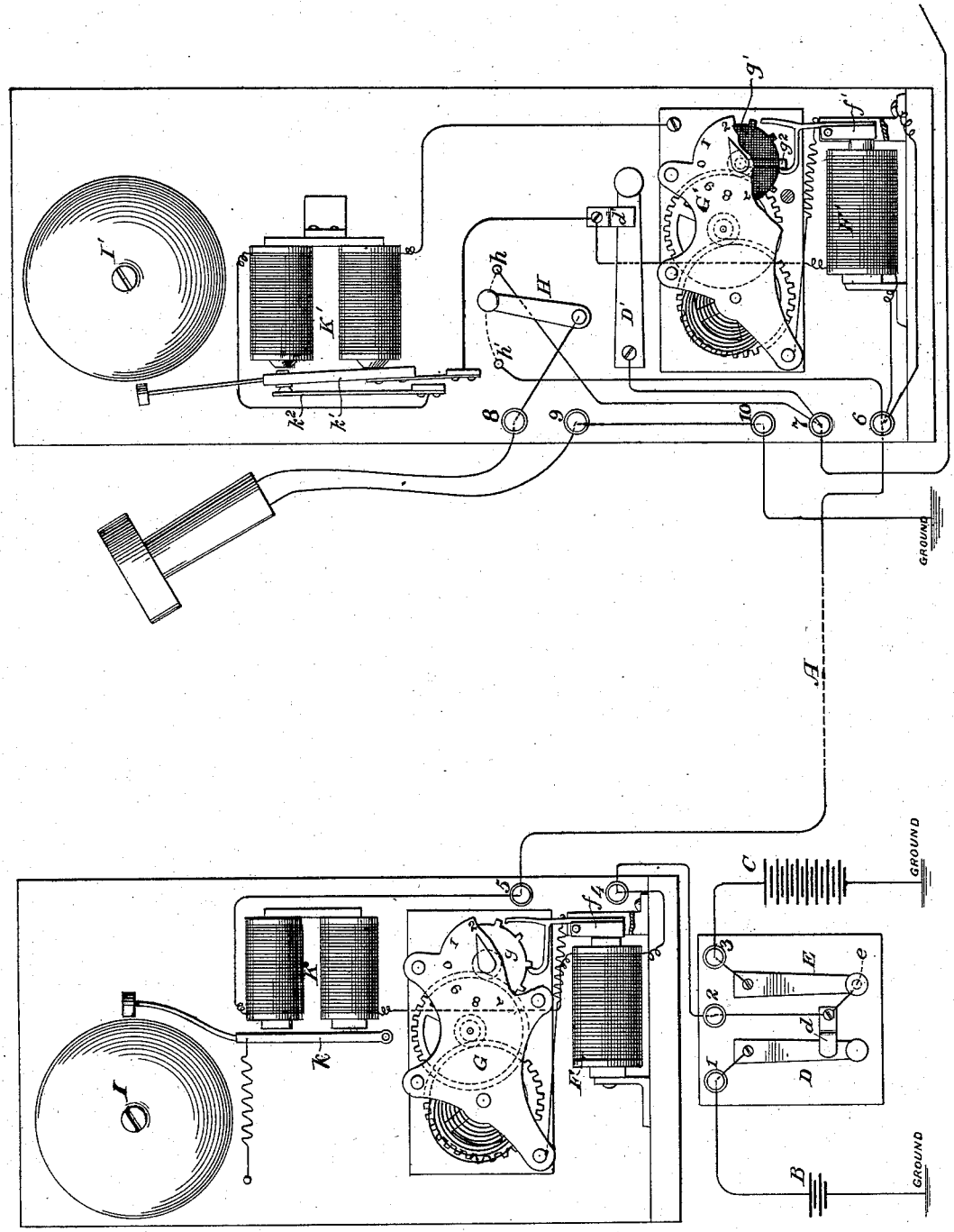

UNITED STATES PATENT OFFICE.

SAMUEL W. FRANCIS, OF NEWPORT, RHODE ISLAND.

IMPROVEMENT IN SIGNALS FOR TELEPHONE AND TELEGRAPH LINES.

Specification forming part of Letters Patent No. 219,244, dated September 2, 1879; application filed July 11, 1879.

*To all whom it may concern:*

Be it known that I, SAMUEL W. FRANCIS, of Newport, in the State of Rhode Island, have invented a new and useful Improvement in Signals for Telephone and Telegraph Lines, which improvement is fully set forth in the following specification.

In district and other telegraphy, or in telephone systems in which there are a number of stations on the same line-wire, alarms or signals are used to call the attention of a person at the central office or at one of the stations with whom it is desired to communicate. It is very desirable to be able for any one of the stations to call the central office, or to be called, without disturbing the others. This result is attained, in the present invention, by means of an electric generator at the central office, without the aid of local batteries at the stations.

The following description will enable those skilled in the art to which it appertains to make and use my invention, reference being had to the accompanying drawing, which forms part of this specification, and represents a part of a telephone-line, showing the apparatus employed at the central office and at one of the signal-stations, in accordance with this invention.

A represents the line; B C, two batteries of unequal power at the central office, the current from battery C having, preferably, about four times the tension of the other; D D', spring-keys, which, by depression, open the circuit through the line A and battery B; E, a spring-key, which, when depressed, puts in circuit the battery C; F F', electro-magnets having pivoted armatures $f f'$, which act as escapements for trains of wheels G G', operated by springs or other suitable motor; H, a switch for putting in and cutting out a telephone; I I', bells, arranged to be operated by means of the electro-magnets K K', having armatures $k k^1$, which, when the current is not passing, are held away from the magnets by means of springs. The numerals represent binding-posts.

From the batteries B C wires lead to the ground and to the posts 1 and 3, respectively, which are connected with the springs D E. The spring D is normally in contact with the piece $d$, while the spring E makes contact with the point $e$ when depressed. The post 2 is connected with both contact-pieces. From the post 2 a wire leads to the post 4, which is connected with the coils of the electro-magnet F. These coils are connected with the coils of the electro-magnet K, and the latter with the post 5. From the post 5 the line-wire leads to the signal-station, being attached to the post 6, which is connected with contact-piece $d'$ through the coils of the electro-magnet F', and also with the pivoted armature $f'$. The spring D' normally rests in contact with the piece $d'$, and is connected with the post 7, and from the latter the line-wire leads to the other stations.

Connection is made through the coils of the electro-magnet K' in the following way: The armature $k^1$ is connected with the contact-piece $d'$. It normally rests in contact with the contact-piece $k^2$, which is connected with one end of the coils of the magnet. The clockwork G' is connected with the other end of the coils.

The escapement-wheel $g^1$ is insulated from the shaft; but a pin, $g^2$, in contact with the shaft, projects through the insulating material, and serves to close the circuit when it comes into contact with the armature $f'$, so that when this takes place the current from the central station divides at the post 6, and part passes through the electro-magnet F' and part through the electro-magnet K'. The resistance through the coils of the magnet K' is preferably made greater than that through the coils of the magnet F', so that only a fraction of the current passes through the magnet K'— insufficient, with the battery B, to attract the armature and ring the bell I'. When, however, the key E is depressed and the battery C is put in circuit, the current will be increased and the bell rung until the key is released.

By connecting the key D' instead of the contact-piece $d'$ with the armature $k^1$, the circuit may be broken by depressing this key, and notice thereby given to the central office that the person at the signal-station is ready to receive the message.

The escapement-wheel $g^1$ of the train of wheels G' is connected with a pointer, which moves over a dial with a series of numbers around its face—a number for each tooth of the escapement-wheel. The train G is also provided with a pointer and dial, which correspond with those of the train G′, so that they move synchronously and always point to the same number.

The telephone-wires are connected with the posts 8 9 at the signal-station. The post 8 is connected with the switch H, and the post 9 with the post 10, and this with the ground.

The switch may be turned to make contact with the point $h$, connected with the post 6, or with the point $h'$, connected with the post 7, thereby grounding the line either to the right or the left.

Before the telephone is placed in circuit it is intended to cut out the battery at the central office, and for this purpose suitable means—such as an additional key or switch—should be used.

The connections for the telephone at the central office may be made substantially in the manner above indicated for the signal-station; but I have not considered it necessary to show the same on the drawing. The central office is also provided with switches and other devices for putting parties on different lines in communication with each other, which may be of any known or suitable construction, as they form no part of this invention. The other stations on the same line are provided with apparatus which are, or may be, identical with that shown, with the exception of the position of the pin or circuit-closer $g^1$, which operates to close the circuit through the call-bell. This should be in a different position for each station, corresponding with the number of the station. Thus in the station shown the pin $g^1$ closes the circuit through the call-bell when the pointers of the several stations indicate 2 on the dials. In the next station its position should be such that the circuit through the call of that station is closed when the pointers indicate 3, and so on for all the stations.

The operation of the invention will be readily understood in connection with the foregoing description.

Normally the battery B is on, and all the pointers indicate 0 on their respective dials. If the operator at the central office desires to call one of the stations—say, No. 2—he depresses the key D twice, and all the escapement-armatures of the magnets in circuit make two vibrations, allowing the escapement-wheels to move two divisions of the circle, so that all the pointers indicate 2 on their dials. At the second station the pin or circuit-closer $g^1$ rests in contact with the vibrating armature, and closes the circuit through the call-magnet K′ also. The current from the battery divides; the part passing through the coils of the magnet F′ being sufficient to retain the armature in contact with it, but that passing through the coils of the magnet K′ being insufficient to ring the bell. At the other stations the circuits through the call-magnets remain broken. Then the operator at the central office depresses the key E and puts in the battery C, which, being of greater power, causes the bell at the first signal-station to ring as long as the key is depressed. Then the battery is cut out entirely, and the telephones are connected in circuit as required.

If the person at the signal-station wishes to call the operator at the central office, he breaks the circuit by means of his key D′ as many times as the number of his station indicates, and the pointers at the central office and at all the stations and the bell at the signal-office also respond. The operator at the central office then puts the person at the station calling in communication with the desired station. When the line is in use this is indicated at all the stations by the dials, so that the fact will be known. When the line is again idle the dials are restored to 0.

Many modifications may be made in the apparatus as described. For example, other means for closing at the proper time the circuit through the call-magnet, controlled by the pulsations of the current on the line, might be used. Any ordinary or suitable call may be employed. At the central station the call-magnet may be connected with a circuit-closer controlled by the pulsations of the current, so that the operator will ascertain by this means whether the call is probably sounded at the signal-station; or the call at the central office may be omitted altogether, reliance being had upon the indications of the pointer alone.

Means may be provided for setting the pointer and circuit-closers of the several stations by the aid of an additional battery or otherwise.

By using a series of circuit-closers in addition to those described, and operated also by the pulsations on the line, the telephone and keys of the different stations may be shunted or cut out, except when the apparatus is set at 0, or when that particular station is using the wire.

I do not, therefore, intend to limit myself to the exact arrangement and details which I have set forth. In some cases it might be practicable to dispense with the larger battery, the call-bells being made to respond to the portion of the current which passes through the same when the circuit for each is closed; but there would then be a liability for the production of a false stroke on the intermediate stations when calling one which requires a number of makes and breaks in the circuit to put its call in circuit.

Having thus fully described my said invention and the manner in which the same is or may be carried into effect, what I claim, and desire to secure by Letters Patent, is—

1. The combination, with a telephone or telegraph line and a call, capable of operation by an electric current, located in a branch circuit at a station on said line, of a circuit-closer controlled by electric pulsations traversing the line, and arranged to connect in the said branch circuit with the line after a predetermined number of pulsations without breaking the continuity of the original line-circuit, substantially as described.

2. The combination, with a telgraph or telephone line, two batteries, and keys for independently opening and closing the line-circuit through said batteries, of a call capable of operation by an electric current of sufficient tension or strength and a circuit-closer controlled by electric pulsations from one of said batteries traversing the line and arranged to close the line-circuit through the call, substantially as described, the tension or strength of current required to operate the aforesaid call being greater than that of the current passing therethrough from the battery employed to operate the circuit-closer, as set forth.

3. The combination, in a signal apparatus, with binding-posts or other means for attaching line-wires, of an electro-magnet with vibrating armatures having its wires connected with said posts, a circuit-closer, and an electric alarm, the said circuit-closer being arranged to be operated by currents traversing the coils of said electro-magnet to close the circuit from the aforesaid binding-posts or points of attachment of the line-wires through the alarm, substantially as set forth.

4. A system of alarms having a number of stations on a line or electric circuit, in which each station is provided with an electrical alarm, a circuit-closer, and mechanism for operating the circuit-closer by the aid of electric currents, the said circuit-closers being connected and arranged to close the line-circuit through alarms at different times for the several stations, and additional battery-power being thrown upon the line to operate the alarm through which the circuit is thus closed, substantially as described.

5. The combination, with a telegraph or telephone line, of an alarm apparatus located at one of the stations thereon, and composed of an electro-magnet with vibratory armature, the coils of which magnet are connected in the line-circuit, an electrical alarm, a circuit-closer controlled by the vibrations of the aforesaid armature, and conductors connected with the line-circuit upon opposite sides of the said electro-magnet, and arranged to connect the alarm in said circuit when the circuit-closer is in proper position therefor, substantially as described, whereby during the sounding of the alarm the circuit-closer will be held in position by that part of the line-current passing through the coils of the aforesaid electro-magnet, as set forth.

In testimony whereof I have signed this specification in the presence of two subscribing witnesses.

SAML. W. FRANCIS.

Witnesses:
WALTER B. SIMMONS,
CHRISTOPHER M. LEE.